Nov. 7, 1961    H. CLASEN    3,007,896
POLYMERIZATION OF A POLY-REACTABLE COMPOUND
IN A CANAL FORMER
Filed Sept. 9, 1953
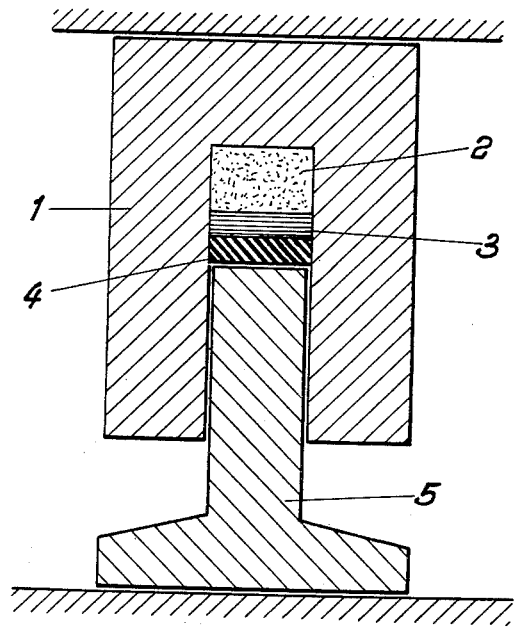
Inventor:
HERMANN CLASEN
Bailey, Stephens + Huettig
ATTORNEYS

United States Patent Office 3,007,896
Patented Nov. 7, 1961

3,007,896
POLYMERIZATION OF A POLY-REACTABLE
COMPOUND IN A CANAL FORMER
Hermann Clasen, Frankfurt am Main, Germany, assignor to Metallgesellschaft Aktiengesellschaft, Frankfurt am Main, Germany
Filed Sept. 9, 1953, Ser. No. 379,278
Claims priority, application Germany Sept. 17, 1952
14 Claims. (Cl. 260—46.5)

The present invention relates to an improved method for carrying out poly-reactions, such as polymerizations, poly-additions and poly-condensations.

It is known that natural rubber is a 2-methylpolybutadiene with an attached 1,4 chain, and therefore has excellent rubber-technical properties and workability. In order to obtain products having good rubber-technical properties (elasticity, extensibility, tensile strength, swellability), attempts have therefore, been made to conduct the polymerization of, for example, butadiene so that the proportion of 1,4 members is as high as possible. Moreover, for many purposes, the highest possible degree of polymerization is desired, such as, for example, when the synthetic rubber is to be extended with a high proportion of oil. Circumstances are similar with other polymerizable substances containing a plurality of double bonds, such as chlorobutadiene, methylbutadiene, cyclopentadiene and octatetraene. Cyclopentadiene, for example, is known to polymerize into an amorphous, fairly valueless substance, probably because the polymerization cannot be completely guided in the linear direction.

Various proposals have been made for favourably influencing poly-reactions, for example by means of auxiliary substances having a regulating or accelerating action. According to one known method, urea has been used as accelerating auxiliary substance in the polymerization of hydrocarbons of the butadiene series, in small amounts and in the cold or in the hot state. In these circumstances however the acceleration of the polymerization is hardly noticeable, and the polymers are just as highly branched as those which are obtained without the addition of urea.

The auxiliary media used hitherto for guiding poly-reactions have not led to satisfactory results. Frequently, too low an average molecular weight is obtained. In addition, they may lead to the incorporation of catalyst components or other auxiliary substances, such as emulsifiers and it previously has been impossible to create strictly reproducible conditions.

It is known that certain chemical compounds, for example urea and thiourea can form addition products or adducts, which are organic occlusion compounds, with for example aliphatic hydrocarbon compounds. In these adducts one of the compounds fits into and is surrounded by the crystal lattice of the other compound which has channel-like cavities. In these channels the partner molecules are deposited one after the other and form the so-called canal inclusion compounds. When, for instance, urea molecules are contacted with straight-chain hydrocarbons the tetragonal urea lattice changes into the hexagonal lattice which has hollow spaces in the form of prismatic canals in which the partner molecules are embedded. In addition to urea and thiourea, desoxycholic acid, dinitrodiphenyl, dextrine, and zeolites are known as canal formers (compounds the structure of which has canal-like cavities). Hydrocarbons and their derivatives are known as occluded compounds. (Fortschr. Chem. Forsch. 2, 92–145 (1951).)

For the purpose of producing the pure monomer before polymerization, or for the purpose of separating the monomer from the polymer, use has already been made of urea inclusion compounds. The polymerization itself, however, was conducted outside the urea.

The present invention is based on the conception that large linear molecules could be built up when molecules capable of poly-reaction are subjected to poly-reaction in the form of canal inclusion compounds in which the reactable partner molecules are included one behind the other in the individual canals so that they become linked together at their ends. According to the present invention, it was found that poly-reactions can thus be achieved to form substantially linear macromolecules by heating the canal-inclusion compounds of poly-reactable partner molecules under such pressure and temperature that no appreciable dissociation of the canal-inclusion compound into canal former and partner molecules occurs, but that the partner molecules are so activated that they react with one another. After the poly-reaction the canal-former or formers can be removed if desired, for example by dissolving or melting out. The separation of canal-formers and included poly-reacted substance can also be effected by removing the latter, for example by means of suitable solvents.

The temperature and duration of the heating, and also the pressure, the purity of the starting material, the size of the single crystals of the canal inclusion compounds have an influence on the molecular weight of the final product obtained. Given sufficiently long heating under sufficiently high pressure, and a starting product which is as pure as possible, and the growth of large single crystals of the canal inclusion compounds, the highest molecular weights can be obtained.

As generally higher temperatures and pressures favor poly-reactions, it is desirable to carry out the process according to the invention with as high a temperature and pressure as possible at which the canal inclusion compounds employed still exist. The conditions under which the canal inclusion compounds are still capable of existence can be easily ascertained by known physical-chemical methods, for example, by ascertaining their equilibrium curves and similar data. The range in which the canal inclusion compounds can exist is displaced as the poly-reaction proceeds and also of course depends upon the nature of the canal inclusion compound. The upper critical limit of the decomposition temperature of the canal inclusion product concerned can be ascertained by ascertaining the point of intersection of the vapor pressure curves of the canal former and the canal inclusion compound. Preferably the temperature employed according to the invention is a little below the critical decomposition temperature of the canal inclusion compound and as high a pressure as possible is employed.

In carrying out the invention, many substances which cannot be directly caused to form canal inclusion compounds in a known manner as monomers, for example butadiene, can be caused to participate by dimerzation and/or on commencement of the poly-reaction, and/or at low temperature and/or at very high pressure. The canal-formers are preferably used in such amounts that the canal cavity suffices to receive the entire reactable compound.

The aforementioned substances may for example be used as canal-formers. The poly-reactable compounds may, by way of example, be: 2,3-dimethylbutadiene-1,3, acetaldehyde, $\alpha,\omega$-silanol; however those mentioned do not by any means exhaust the compounds suitable for the method according to the invention.

When a large excess of canal-formers is used, these act not only as canal formers, but also as pore formers, so that for example in the polymerization of styrene by the method of the present invention, porous polystyrene is obtained directly upon dissolution of the thiourea.

The canal inclusion compounds can be produced at low temperatures with the aid of low boiling liquids which are capable of forming poorly stable canal inclusion compounds and are capable of poly-reaction with the included substances. For example, in the polymerization of butadiene, ethylene can be used as such a liquid. The canal inclusion compounds can also be produced from calculated amounts of canal-formers and substances to be included under the liquid pressure of the substance to be included occurring on heating in a closed vessel.

Different substances entering into poly-reactions with one another can also be employed simultaneously in the method according to the invention. Thus, for example, styrene and 2,3-dimethylbutadiene-1,3 can be simultaneously intercalated, for example, in thiourea, and be co-polymerized in this state.

After the poly-reactable substances have been enclosed or occluded in the canal-former, the substances enclosed in the canals can be forced into a poly-reaction by heating the canal inclusion compounds under pressure without further catalysts, and this poly-reaction will lead, in the case of long narrow canals, to likewise long, largely unbranched and non-cyclized macromolecules. Since in many cases, large single crystals of the canal inclusion compounds can be grown, enormously large macromolecules are produced, provided that only those substances are included which can undergo complete poly-reaction and are not contaminated, for example by paraffinic hydrocarbons. Since crystals of uniform size of the canal inclusion compounds are easily obtained, for example by filtering out, and can then be caused to enter into the poly-reaction of the present invention, a product of maximum uniformity in molecular size can be obtained. A predetermined mixture of predetermined grain sizes of canal inclusion compounds can also be used, and a definite distribution of the molecular sizes is then obtained. The poly-reaction of the present invention can be carried out in a completely reproducible manner.

In carrying out the poly-reaction according to the invention under pressure, it has been found expedient to carry out such reaction with the canal inclusion product in contact with a substance, such as mercury, which is flowable under the conditions of the reaction but which will not react with the poly-reacted substance or canal-former or act as a solvent for such canal-former or poly-reacted substance either as such or in the form in which it is included in the canal inclusion compound, in order to ensure uniform application of pressure to the canal inclusion compound and to components thereof during said poly-reaction.

The method of the present invention can also be advantageously applied to such monomers as styrene, vinyl chloride, and other mono-olefines, which are incapable of undergoing branched polymerization, since when using canal inclusion compounds of uniform grain nature, uniformly large, and also very long and above all non-cyclized, macromolecules are obtained and the polymer has finally, after removal of the thiourea, for example, by dissolving out, a fibril-like structure.

The hereindescribed method is also suitable for the production of regularly cross-linked products, for which purpose poly-reactable compounds having functional groups in the middle position are subjected to poly-reaction within the canal-former. The functional groups in the middle position do not co-react during poly-reaction within the canal-former are only able to react subsequently with one another after the removal of the interposed canal-former. For example, longer $\alpha,\omega$ silanols having a third OH group in the middle position are poly-reacted within the canal-former and the OH group in the middle position, after removal of the canal-former, is then condensed with the OH groups of the water. Similarly the middle position double bonds of neighbouring macromelocules with the separation of 1,4-polybutadiene can also be reacted to form sulphur bridges.

Since according to the invention the canal-former can also be dissolved out, for example, with a softening agent or plasticizer containing emulsion or with a dispersion of a solid or the like, the homogeneous mixture of polymerizate and softening agent or, for example, vulcanization agents, is obtained directly without heavy mixing machines or long swelling being required.

The hereindescribed method can be applied without difficulty to those poly-reactions in which the desired reaction is not dependent on the strictly alternating inclusion of different substances in the canal-former and can thus be applied for example when carrying out the so-called aldol condensation or condensations of $\alpha,\omega$ silanols. Since the tendency to form siloxane rings of low molecular weight is particularly great in the condensation of silane diols or siloxane diols, the hereindescribed method is of very particular importance for the production of high grade polysiloxanes (silicon elastomers). It is more difficult to include two different reaction components, such as for example diisocyanates and glycols, in the canals in strictly alternating sequence. However, these poly-reactions can also be successfully carried out when the steps to be taken in carrying out the present invention are precisely and appropriately followed.

As will be apparent from the foregoing description, the method of the present invention is of general application for building-up large molecules from smaller molecules. A particular advantage is that by this means very large, uniform macromolecules of strictly linear structure can be built up. The products therefore have excellent mechanical properties.

The accompanying drawing shows an apparatus suitable for carrying out the process according to the invention in section.

The invention is further illustrated by the following non-limitative examples:

*Example 1*

A high-pressure-resistant vessel having a capacity of 1000 cc. was filled with a mixture of 956 g. of very finely pulverised urea (0.956 gram per cc. is the density of hexagonal urea) and 170 g. of very pure liquid butadiene at −80° C. The vessel was closed in a pressure-tight manner and slowly heated. The liquid butadiene thus expanded and the vessel was under the expansion pressure of liquid butadiene. This liquid pressure obviously forced the butadiene into the urea, the crystal lattice of which is evidently transformed into the known hexagonal lattice, which has long canal-like cavities. The heating was not carried out too rapidly since the inclusion of the butadiene does not occur suddenly and the liquid pressure would otherwise be dangerously high. Heating was then continued for 14 days at 130° C. after which a uniform solid crystal mass was obtained, which was wetted in water and when dissolved in water left behind a substance similar to natural rubber. It was ascertained by known methods that the 1,4 fraction is just as large are in natural rubber. The urea can be recovered from the aqueous solution.

*Example 2*

Finely pulverised urea was stirred for 24 hours in a Dewar flask with a mixture of pure liquid butadiene in liquid ethylene. The stirring vessel was in communication with the atmosphere through a tube filled with drying agent. The ethylene was then boiled off. The further treatment of the resulting urea-butadiene adduct, which was further cooled with Dry Ice, will be explained with reference to the accompanying drawing which shows in section a thick-walled press mould 1 of steel with a ram 5. The cold urea-butadiene adduct 2 was introduced into the pre-cooled press mould 1, and pre-cooled mercury 3 and gasket 4 were inserted, the mould was turned and then compressed in a heavy hydraulic press, so that the pressure amounted to 2000 kg. per sq. cm. of ram area. The press was heated for 14 days at 120° C. The urea was removed with water and the product was similar to natural caoutchouc with respect to its rubber-technical properties. It was readily soluble in benzene and yielded highly elastic and tear-resisting vulcanizates.

*Example 3*

100 cc. of saturated methanolic thiourea solution were mixed with 3 cc. of cyclohexadiene-1,3. The resulting precipitate was washed for a short period with saturated methanolic thiourea solution, and then immediately subjected to long heating under pressure as in Example 2 at 180° C. After dissolving out the thiourea with water, a tough leatherlike polymerizate was obtained.

*Example 4*

100 cc. of saturated methanolic thiourea solution were mixed with 20 cc. of a mixture of equal mol parts of styrene and 2,3-dimethylbutadiene-1,3, and the precipitate, after washing, was subjected to heating under pressure as in Example 2. After washing with water, a mixed polymer, very readily swellable in benzine, was obtained.

*Example 5*

5 cc. of tetramethyldihydroxydisiloxane

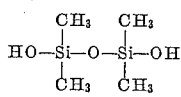

were mixed with 100 cc. of methanol kept at −80° C. and thiourea as the canal-former, and stirred for 24 hours. The resulting adduct was slightly heated under pressure, for example as in Example 2. After dissolution in water, a viscous silicone resin separated out, which contained no readily volatile siloxanes of low molecular weight.

By working in the same manner with trimethyltrihydroxydisiloxane, a resin which on heating sets into a non-brittle solid body was obtained, while on the other hand simple heating of trimethyltrihydroxydisiloxane led to a brittle substance.

Useful polymerisates of cyclopentadiene, cyclocotatetraene, dicyclopentadiene, 2-chlorobutadiene and so on can be produced in similar manner. Dextrines in aqueous solution also appear to be suitable for the polycondensation of α,ω diols.

*Example 6*

10 g. of thiourea ground to as fine a powder as possible to go through a sieve of 10,000 meshes per cm.² were shaken with 40 cubic centimeters of 2,3-dimethylbutadiene and 1 drop of methanol for 4 days at 0° C. The butadiene was freshly rectified under nitrogen and immediately treated with 0.5% hydroquinone. All other operations also took place under nitrogen. The dimethylbutadiene which was not taken up by the thiourea during the 4 days' shaking was removed by careful evaporation. At a ratio of 3.3 moles of thiourea per mole of 2,3-dimethylbutadiene the vapor pressure suddenly dips, and the dew point sinks and the curve which results when the loss of weight upon vaporization of the butadiene to the air is plotted against time, has a break when this ratio is reached. When the resulting substance was enclosed in a thin walled glass tube and an X-ray diagram was made, it was ascertained that the diagram corresponded to the diagram of a known canal inclusion product of 2,2,4-trimethylpentane in thiourea. The X-ray diagram as well as the moles ratio of 3.3 clearly indicated that the 2,3-dimethylbutadiene also had formed a canal inclusion product with the thiourea.

The canal inclusion product was then introduced into a press as in Example 2 and held at 50° C. for 14 days under 2000 kg./cm.² pressure. A solid product of constant weight was thus obtained whose X-ray diagram corresponded to that of the canal inclusion product. If the polymerization had taken place outside of the canal inclusion product the X-ray diagram of thiourea would have been obtained. After the thiourea had been dissolved out of the product with water, the polymeric substances possessed excellent rubber-technical properties.

The polymerisation can also be effected with the aid of ultraviolet light or X-rays or by storing the canal inclusion product for months without use of elevated pressures and temperatures.

I claim:

1. In a method of carrying out a poly-reaction with mutually poly-reactable molecules, the steps which comprise forming a crystalline canal inclusion compound from the poly-reactable molecules and a canal former in which the poly-reactable molecules are occluded in canals in such canal former and carrying out the poly-reaction between the poly-reactable molecules while they are thus occluded in the canal former of the canal inclusion compound under conditions under which said canal inclusion compound is capable of existence to form a linear macromolecular poly-reaction product.

2. The process of claim 1 in which said poly-reactable molecules are molecules of poly-reactable substances selected from the group consisting of olefines, aldehydes and diols.

3. The process of claim 1 in which said crystalline canal inclusion compound is produced at a high pressure which is within the range within which such canal inclusion compound is capable of existence.

4. The process of claim 1 in which said crystalline canal inclustion compound is produced at as low a temperature as possible which is within the range within which such canal inclusion compound is capable of existence.

5. The process of claim 1 in which said crystalline canal inclusion compound is produced by heating a calculated amount of the poly-reactable molecules and of the canal former in a closed vessel under the liquid pressure of the poly-reactable molecules occurring during such heating.

6. The process of claim 1 in which said poly-reactable molecules are molecules of a plurality of different mutually poly-reactable substances.

7. The process of claim 1 in which said poly-reactable molecules are molecules of a substance having functional groups in the middle position and after completion of the poly-reaction while such molecules are occluded in the canal former of the canal inclusion compound, separating the poly-reaction product from the canal former and thereafter reacting the middle functional groups with one another.

8. The method according to claim 1 in which such poly-reaction is carried out at an elevated temperature and pressure at which no substantial dissociation of the canal inclusion compound occurs, and after completion of the poly-reaction the poly-reaction product is separated from the canal-former.

9. A poly-reaction product produced according to the process of claim 8.

10. The process of claim 1 in which said crystalline canal inclusion compound is produced with a sufficient quantity of the canal former that the canal cavities of said canal former are sufficient to receive the entire quantity of the poly-reactable molecules.

11. The process of claim 10 in which the quantity of the canal former is in excess of that necessary to receive the entire quantity of the poly-reactable molecules.

12. The process of claim 1 in which said polyreaction is carried out while said crystalline canal inclusion compound is subjected to an elevated pressure and temperature within the range within which said canal inclusion compound is capable of existence in contact with a substance which is flowable and inert as well as a nonsolvent for said canal former and said poly-reactable molecules under the conditions of the reaction.

13. The process of claim 12 in which said substance which is liquid under the conditions of the reaction is mercury.

14. A crystalline canal inclusion compound of a linear macromolecular poly-reaction product occluded in a canal former.

References Cited in the file of this patent

UNITED STATES PATENTS

| | | |
|---|---|---|
| 1,113,630 | Hoffman | Oct. 13, 1914 |
| 2,401,348 | Hauser et al. | June 4, 1946 |
| 2,406,453 | Charlton et al. | Aug. 27, 1946 |
| 2,406,454 | Charlton et al. | Aug. 27, 1946 |
| 2,499,820 | Fetterly | Mar. 7, 1950 |
| 2,680,595 | Upham | June 8, 1954 |

OTHER REFERENCES

Oehler et al.: Journal of Research of Nat'l Bureau of of Standard Research, Paper No. RP1951, volume 42, January 1949, pages 63–66.

"High Molecular Weight Organic Compounds," Interscience, New York (1949), pages 20–33.

Marschner: "C. & I. News," volume 33, No. 6, February 7, 1955, pages 494–96.